United States Patent

Brabanec

[19]

[11] Patent Number: 6,111,939
[45] Date of Patent: *Aug. 29, 2000

[54] METHOD AND APPARATUS FOR PROCESSING CALLER IDENTIFICATION IN A POWER MANAGED COMPUTING ENVIRONMENT

[75] Inventor: Charles L. Brabanec, Portland, Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/838,236

[22] Filed: Apr. 16, 1997

[51] Int. Cl.⁷ .................................................. H04M 1/56
[52] U.S. Cl. .................. 379/142; 379/93.05; 379/93.23; 379/422
[58] Field of Search ..................................... 379/111, 112, 379/121, 127, 142, 93.17, 93.23, 88, 247, 93.05, 441, 442, 140, 199

[56] References Cited

U.S. PATENT DOCUMENTS

| | | |
|---|---|---|
| 4,656,318 | 4/1987 | Noyes .......................................... 379/93 |
| 5,146,490 | 9/1992 | Beckman .................................. 379/113 |
| 5,343,516 | 8/1994 | Callele et al. ............................. 379/98 |
| 5,377,260 | 12/1994 | Long ......................................... 379/142 |
| 5,671,269 | 9/1997 | Egan et al. ................................ 379/142 |
| 5,727,047 | 3/1998 | Bentley et al. ............................ 379/93 |
| 5,781,621 | 7/1998 | Lim et al. ................................. 379/142 |
| 5,819,069 | 10/1998 | Wong et al. .............................. 395/500 |

*Primary Examiner*—Curtis A. Kuntz
*Assistant Examiner*—Binh K. Tieu
*Attorney, Agent, or Firm*—Blakely, Sokoloff, Taylor & Zafman LLP

[57] ABSTRACT

The present invention discloses a method and apparatus to process a Caller-ID signal and store the caller-ID message in a buffer while the computer system is in a sleep state. The telephone controller detects the telephone ring and switches the signal path to receive the Caller-ID signal. A Caller-ID decoder converts the received Caller-ID signal into a Caller-ID code to be stored in a Caller-ID buffer. The processor sends a signal to activate the computer system. Upon activation, the computer system retrieves the Caller-ID code from the Caller-ID buffer. Therefore, the Caller-ID code is not lost during the powered-down or sleep period.

15 Claims, 4 Drawing Sheets

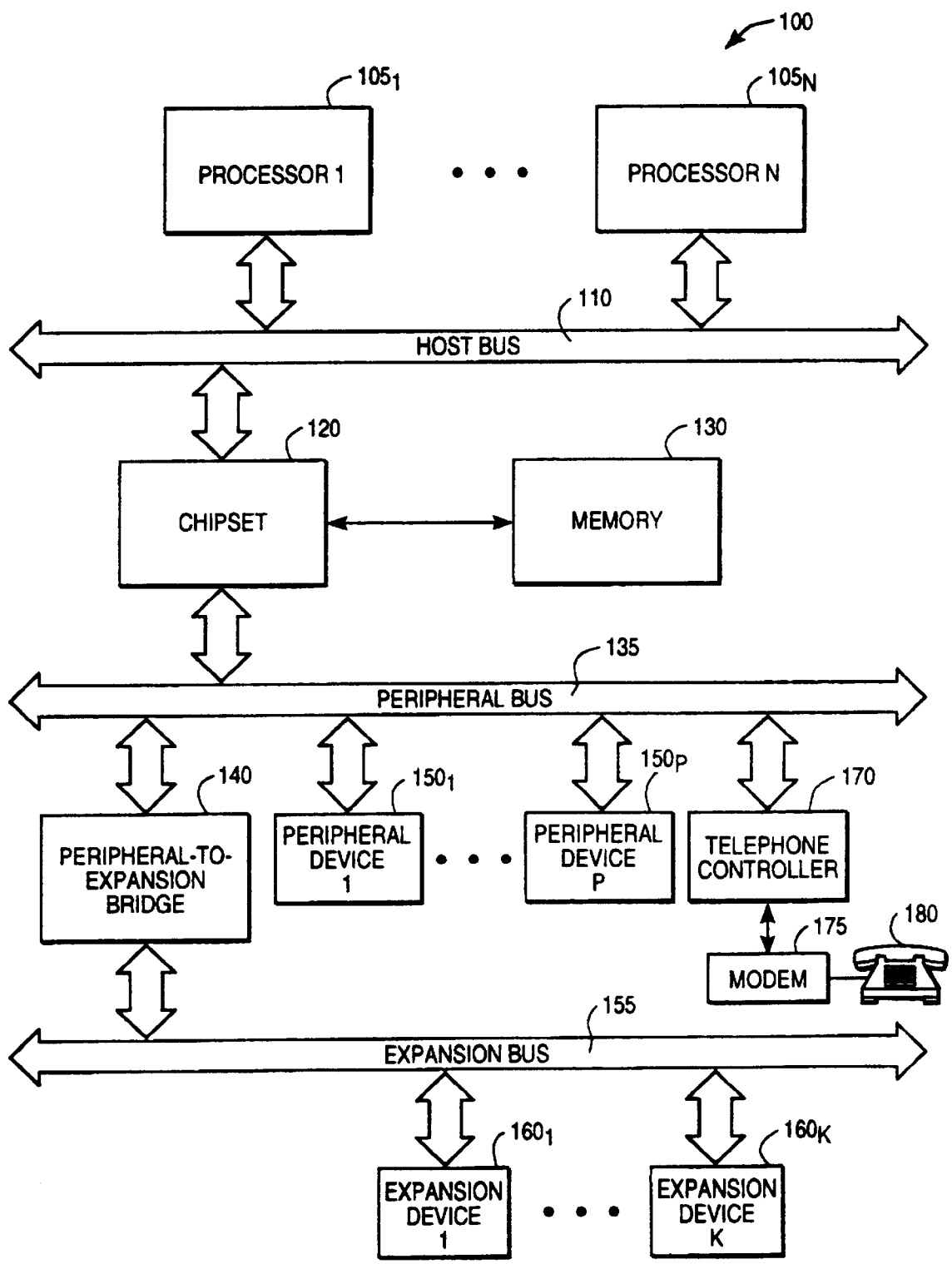
FIG_1

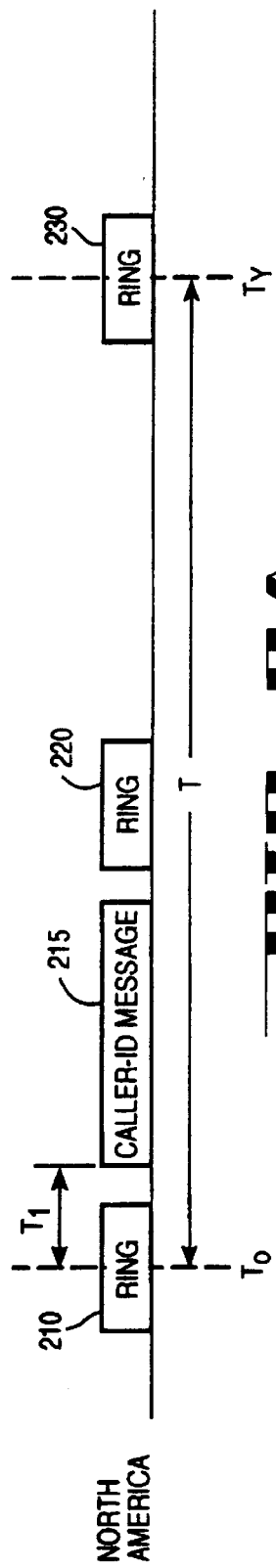
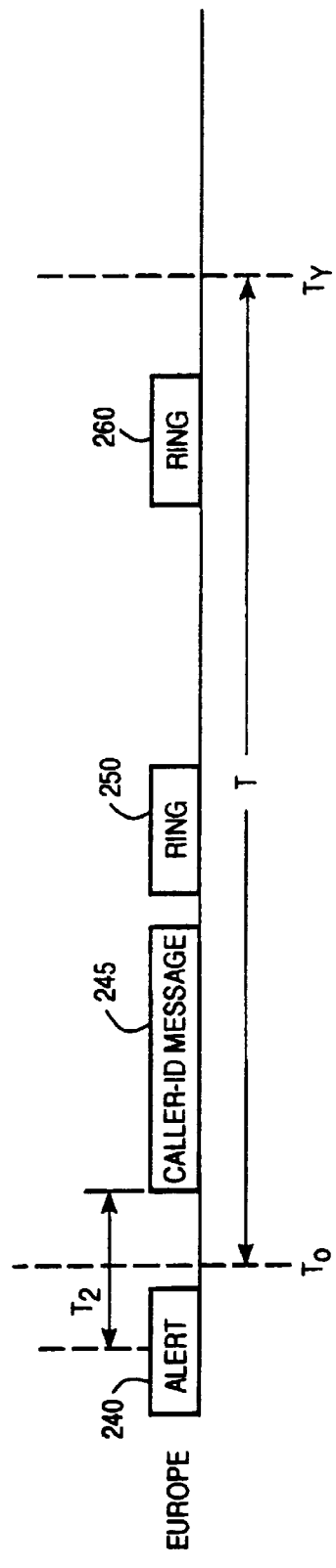
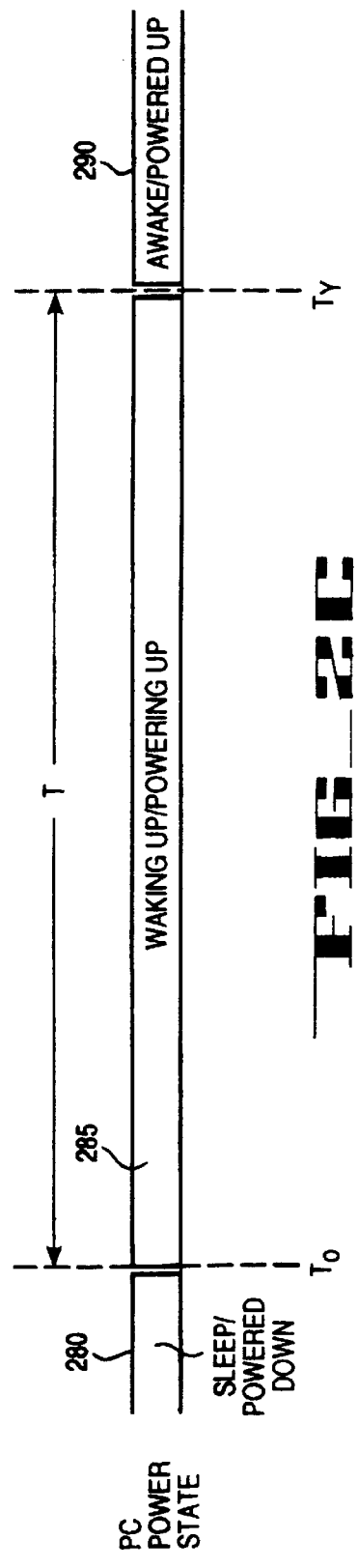

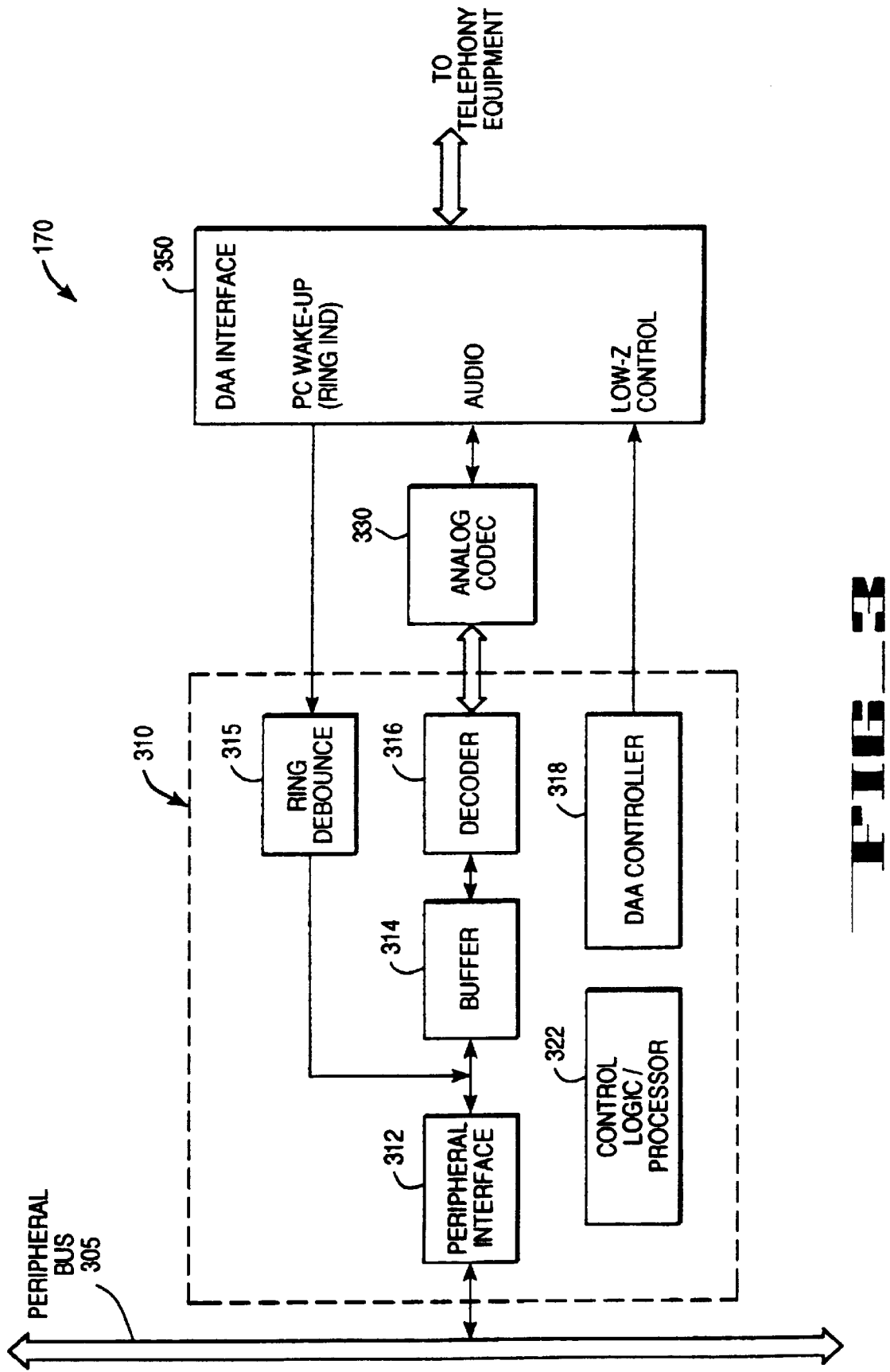
FIG_3

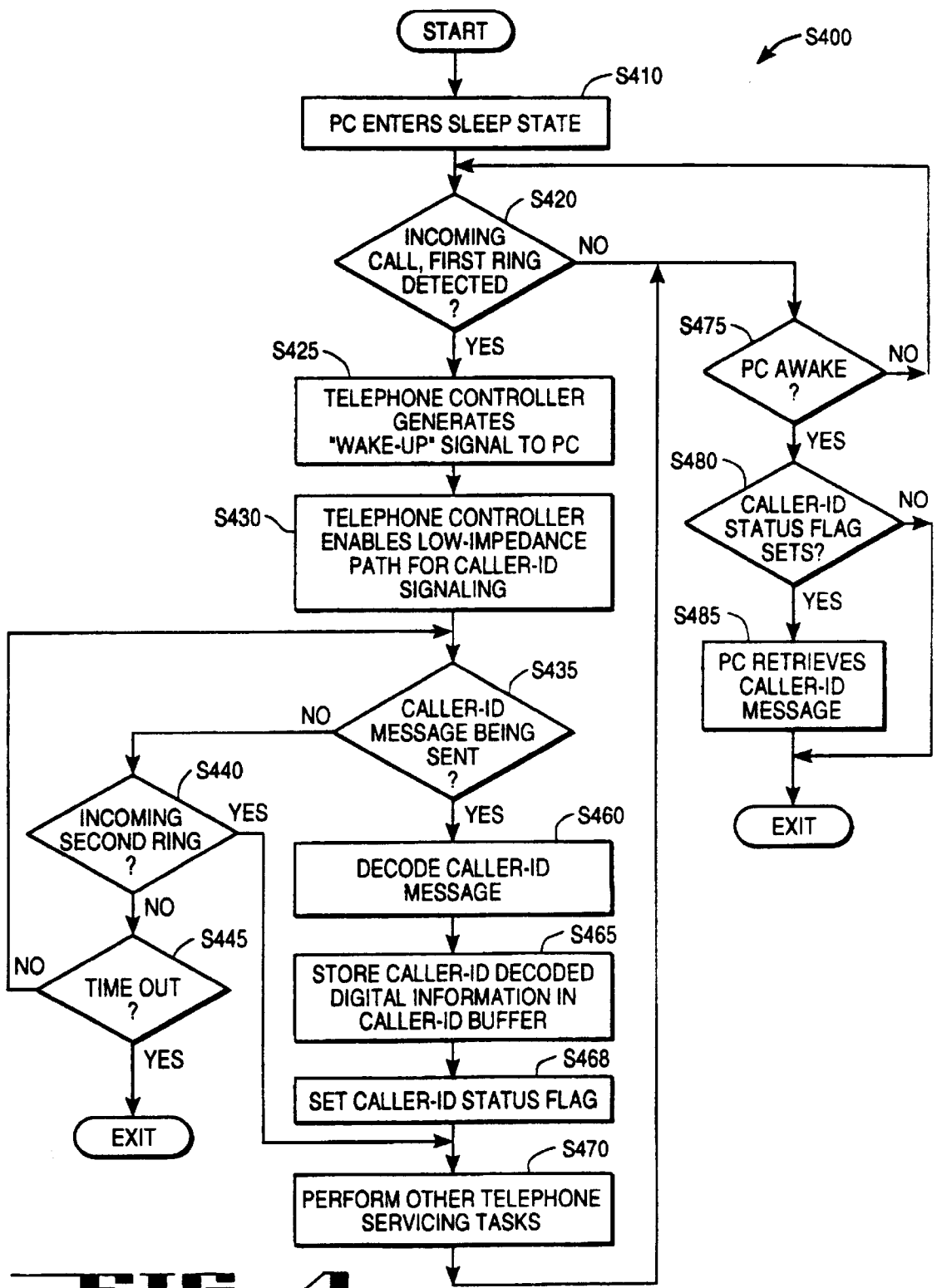
FIG_4

METHOD AND APPARATUS FOR PROCESSING CALLER IDENTIFICATION IN A POWER MANAGED COMPUTING ENVIRONMENT

BACKGROUND OF THE INVENTION

1. Field of the Invention

The present invention relates in general to the field of telephony information storage and retrieval. More particularly, the present invention relates to processing of telephone caller identification information while the computer is in a powered-down mode.

2. Description of Related Art

As personal computers (PCs) increase in computing power, many applications that are traditionally performed by specialized equipment now can be supported by the PC. Examples of these applications include the provision of facsimile services, telephony services, teleconferencing, video conferencing, and banking.

One of the telephony services that may be supported by the PC is retrieval of Caller-Identification (Caller-ID) information. Caller-ID is a service provided by telephone companies to allow the recipient of a telephone call to retrieve identification information regarding the caller, such as the caller's telephone number. Such Caller-ID signaling is issued by the switching equipment of the telephone company only once, immediately before or after a first ring indicative of an incoming call. To avoid missing the Caller-ID signal, the receiving end equipment such as a PC or a PC that is attached to existing telephony devices, must be powered up and ready to receive and process the information.

A PC is typically interfaced with telephony devices through an external or an internal modem. However, in conventional computers, the microprocessor and its associated peripheral devices (such as the communication serial interface and memory devices) must be powered up and in an active, operational state at the time the call comes in order to capture the caller-ID information.

The continuous maintenance of a PC in powered-on state is impractical due to the associated energy costs involved. In particular, high performance microprocessors such as the Intel Pentium® microprocessor, have a high power consumption. In addition, there is a trend towards the implementation of increased memory and mass storage in a typical PC. For example, it is not unusual to have a PC populated with 32 MBytes of RAM and more than 1 Gbyte of mass storage. Together with the implementation of other peripheral devices such as a Compact Disc-Read Only Memory (CD-ROM) drive, a high density floppy drive and multimedia devices, a typical PC usually consumes power in excess of 200 Watts.

To conserve power and/or to reduce power consumption, a flexible power management scheme has been developed which switches the PC to a powered-down mode, or sleep state, when there is an indication of user inactivity. The PC may subsequently be awaken or powered-on by automatic detection of some activity such as depression of a key, or by flipping a sleep release switch.

In PCs implementing such power management schemes, retrieval of the Caller-ID information through the modem is unsuccessful because the time it takes to activate the PC is normally longer than the time interval between the start of the first ring, or the alert tone (in European countries), and the issuance of the Caller-ID signal. As a result, the Caller-ID information is typically lost.

Accordingly, there is a need in the technology for an apparatus and method for capturing, storing and retrieving Caller-ID information in a PC while the PC is in a powered-down or sleep state or is transitioning from a powered-down state to an operational state.

SUMMARY OF THE INVENTION

A computer system is configured to receive the caller identification signal while it is in a powered-down or sleep mode. The computer system comprises a processor and a control circuit coupled to the processor. The control circuit receives the caller identification signal while the computer system is in a powered-down or sleep mode. The control circuit sends a signal to activate the computer processor and converts the caller identification signal into a caller identification code.

BRIEF DESCRIPTION OF THE DRAWINGS

The features and advantages of the present invention will become apparent from the following detailed description of the present invention in which:

FIG. 1 is a block diagram illustration of a computer system incorporating the present invention.

FIG. 2 is a timing diagram illustrating the relationship between the Caller-ID information and the telephone rings.

FIG. 3 is a block diagram illustration of one embodiment of a system that operates in accordance with the teachings of the present invention.

FIG. 4 is a flowchart showing the steps that operate in accordance with the teachings of the present invention.

DESCRIPTION OF THE PRESENT INVENTION

The present invention discloses a method and apparatus for capturing, storing and retrieving Caller-ID information while a personal computer (PC) is in a powered-down state. The apparatus monitors the telephone line loop voltage, and upon detection of an incoming call, the Caller-ID signal is decoded and stored. The PC, when powered-up, may retrieve the Caller-ID information.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Referring to FIG. 1, an illustrative embodiment of a computer system utilizing the present invention is shown. The computer system 100 comprises one or more processors $105_1$–$105_N$ ("N" being a positive whole number) and a main memory element 130 coupled together by a chipset 120. Examples of the main memory element 130 includes a dynamic random access memory (DRAM) and a static random access memory (SRAM). In general, the chipset 120 operates as an interface between a host bus 110 and a peripheral bus 135.

In one embodiment, the processors $105_1$–$105_N$ are the Pentium® or Pentium® Pro microprocessors manufactured by Intel Corporation at Santa Clara, Calf. It is understood by one of ordinary skill in the art that other processors may be implemented in the present invention.

Chipset 120 typically includes a cache DRAM controller (CDC), a peripheral bus controller, and a data path unit (DPU). A Peripheral Component Interconnect (PCI) Bridge (PB) 140 provides a set of host-to-PCI and PCI-to-host bus transaction translations.

The host bus 110 can support transactions between a number of connected processors $105_1$–$105_N$ or between the processors $105_1$–$105_N$ and the chipset 120. In particular, the host bus 110 may be referred to as a parallel bus or a multiprocessor bus because it supports parallel operations and multiple processors. The host bus 110 may also operates in a pipelined manner to increase efficiency. However, these features should not be construed to limit the teachings of the present invention. The present invention can be utilized if there is only one processor connected to the host bus 110.

A peripheral bus 135 provides a communication path between the processors $105_1$–$105_N$ or main memory element 130 and a plurality of peripheral devices $150_1$–$150_P$ ("P" being a positive whole number). These peripheral devices $150_1$–$150_P$ may include I/O devices such as disk controllers, data entry interface circuits, and pointing device controllers. In one embodiment, peripheral bus 135 is a Peripheral Component Interconnect (PCI) bus.

An expansion bus 155 provides a communication path between the peripheral bus 135 and a plurality of expansion peripheral devices $160_1$–$160_K$ ("K" being a positive whole number). In one embodiment, the expansion bus 155 is an Industry Standard Architecture (ISA) bus or an Extended Industry Standard Architecture (EISA) bus.

A Telephone Controller 170 is one of the peripheral devices that is coupled to either peripheral bus 135 or expansion bus 155. It is apparent to one skilled in the art that it is immaterial which bus the Telephone Controller 170 is coupled to as long as one or more of the processors $105_1$–$105_N$ is able to communicate with it.

The Telephone Controller 170 is also coupled to telephone equipment 180 via a modem 175. It is contemplated that the Telephone Controller 170 does not have to be physically separated from the modem 175. Many intelligent controllers within a modem can perform the tasks of the Telephone Controller 170. In addition, the modem 175 may be implemented as part of the processors $105_1$–$105_N$.

FIGS. 2A–C are timing diagrams illustrating the timing relationship between the Caller-ID signal time and an initial telephone ring signal.

FIG. 2A illustrates the telephone ringing and Caller-ID signaling pattern in North America. The ringing signal 210 constitutes the first ringing signal provided by an incoming call at time $T_0$. The interval $T_1$ is the time interval between substantially the middle of the ringing signal 210 and the onset of the Caller-ID signal as provided by the switching equipment at the telephone company. In North America, $T_1$ is approximately 2 seconds. The Caller-ID signal interval 215 is the time interval during which the Caller-ID signal is sent. The ringing intervals 220 and 230 are the second and the third rings, respectively, from the incoming call. Additional ringing signals may be issued if the call is not answered.

FIG. 2B illustrates the telephone ringing and Caller-ID signaling pattern in Europe. The intervals 240, 250, and 260 are respectively the alert signal, first, and second rings from the incoming call. The onset of Caller-ID signal 245 occurs after the alert signal 240 at the time interval $T_2$ measured from the middle of the alert signal. In Europe, $T_2$ is approximately 0.1 second. Additional ringing signals may be issued if the call is not answered.

FIG. 2C illustrates the typical corresponding intervals in a PC which reflect various states of the PC during the initial ringing signaling and the Caller-ID signaling intervals. The PC is in a powered-down mode, or the sleep state, when the initial ring signal is received, as shown by the interval 280. Upon receipt of the first ring at approximately $T_0$, the Telephone Controller 170 issues a signal to power-up the PC while processing the Caller-ID signal. The waking time interval 285 lasts for approximately T seconds. T may range from 10 to 30 seconds, depending on the system configuration. After T seconds, near the timing reference $T_Y$, the PC is fully powered on, as shown in the timing interval 290. During this powered-up time interval 290, the PC can query the Telephone Controller 170 and accordingly retrieve the Caller-ID information previously stored in the TC 170.

As is understood by anyone of ordinary skill in the art, the values for the time intervals $T_1$, $T_2$, and T are provided only for illustrative purposes. The method and apparatus in the present invention may be practiced using approximated values $T_1$, $T_2$, and T.

FIG. 3 is a block diagram illustrating one embodiment of the telephone controller 170 of the present invention. The Telephone Controller 170 comprises three main elements: the Processor 310, an Analog Codec 330, and a Data Access Arrangement (DAA) Interface 350.

The DAA Interface 350 interfaces to the telephone equipment, provides audio and ring signal to the Analog Codec 330, provides the PC wake-up (ring indicator) signal to the processor 310 receives audio signal from the Analog Codec 330, and receives the low-impedance control signal from the Processor 310.

The Analog Codec 330 converts the analog samples from DAA Interface 350 into digital bits to Processor 310. The Analog Codec 330 also converts the digital bits from the Processor 310 to the analog samples to be sent to the DAA Interface 350.

The Processor 310 performs data processing and interfaces to the PC microprocessor $105_1$–$105_N$. In one embodiment, this interface is through the peripheral bus 135. The Processor 310 comprises a Peripheral Interface 312 such as a PCI interface, the Buffer 314, a Ring Debounce 315, a Decoder 316, a DAA Controller 318, and the Logic Controller/Processor 322.

The DAA Controller 318 switches the signal loop to low impedance to provide the path for the telephone signal to go through. The DAA Controller 318 may be implemented as an Input/Output (I/O) port received a command from Control Logic/Processor 322.

The Control Logic/Processor 322 is the controller for the Processor 310. In one embodiment the Control Logic/Processor 322 is a digital signal processor (DSP) having sufficient memory for program and data storage.

The Caller-ID Decoder 316 sorts out the bit stream into meaningful messages. Examples include performing the Frequency Shift Keying (FSK) operation, stripping off the status bits and converting into ASCII characters. Caller-ID Decoder 316 may be a specially designed circuit to perform the tasks or a software routine executed by Control Logic/Processor 322.

The Ring Debounce 315 filters the ring indicator signal from the DAA Interface 350 to ensure that it is indeed a ring signal. The filtering or debouncing may be carried out by averaging the signal over a period to eliminate glitches or high frequency components caused by noise in the system. Ring Debounce 315 may be a specially designed circuit or a software routine executed by Control Logic/Processor 322.

The Buffer 314 is a storage element that stores the decoded Caller-ID signal or message. Caller-ID Buffer 314 may be implemented by a number of methods. One method is using a dual-ported Random Access Memory (RAM) to allow the processor in the PC to read the contents without interfering with the operations of the Processor 310. Another method is using a First-In-First-Out (FIFO) queue. Yet another method is to map the Caller-ID Buffer to the local address of the Control Logic/Processor 322 and let the PC processor to retrieve the data using Direct Memory Access (DMA). Another method is to organize the Caller-ID information into compact words stored in registers which are mapped as memory address or input/output locations as the Caller-ID Buffer 314.

The Peripheral Interface 312 provides an electrical interface for mapping the Processor 310 onto the PC memory address space through the Peripheral Bus 305.

The Processor 310, the Analog Codec 330, and the Data Access Arrangement (DAA) Interface 350, are continuously powered either by normal power supply or secondary power source such as battery. These elements are powered up when the PC is in the sleep state.

Referring to FIG. 4, a flowchart illustrating the Caller-ID storage and retrieval process S400 of the present invention. Beginning from a START state, the PC enters a sleep or powered down state by switching to power down mode (Step S410). During the sleep state, non-essential components and devices within the PC are disabled. Critical components remain powered or switched to battery back up supply. During the PC's sleep state, the DAA Interface 350 continuously monitors the telephone ring or the alert signal (Step S420). If a first telephone ring is detected (Step S420), the Telephone Controller 170 generates a "wake-up" signal to the PC (Step S425). The process S400 then proceeds to process step S430. If not, the process S400 proceeds to decision step S475.

At process step S430, the Telephone Controller prepares to receive the Caller-ID information by enabling the low-impedance path for Caller-ID signaling (Step S430). The Telephone Controller then monitors to determine if the Caller-ID information is being sent (Step S435). If not, the process S400 proceeds to decision step S440. Otherwise the process S400 proceeds to step S460.

At process step S440, if the second ring is not received, the process S400 proceeds to decision step S445; otherwise, it proceeds to process step S470. At process step S445 it is determined if the telephone line is cut-off, or if the caller has hung-up, or if a predetermined time-out period has expired so the process S400 returns to monitoring Caller-ID information (Step S435); otherwise, the process S400 enters an EXIT state. At process step S470, the Telephone Controller proceeds with other telephone service tasks such as enabling the voice mail message control.

At process step S460, the Telephone Controller decodes the quantized Caller-ID information into a Caller-ID code (Step S460). The Caller-ID code is then stored in the Caller-ID Buffer for later retrieval (Step S465). A Caller-ID status flag is then set to inform the PC that there is new Caller-ID information (Step S468). Then the Telephone Controller proceeds with other telephone services such as enabling the voice mail message control (Step S470). Thereafter, the process S400 proceeds to decision step S475. At decision step S475, it is determined if the PC is awake (Step S475). If the PC is not awake, process S400 returns to monitor the next incoming call at decision process S420.

If the PC is awake, the PC checks the Caller-ID status flag to determine if a new Caller-ID code has been stored in the Caller-ID Buffer (Step S480). If there is a new Caller-ID code, the PC proceeds to retrieve the Caller-ID code from the Caller-ID Buffer and resets the status flag (Step S490). If there is no new Caller-ID code, the PC proceeds with its normal tasks.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A computer system configured to receive caller identification information during a sleep mode, comprising:
   a first processor; and
   a control circuit coupled to the first processor for receiving a caller identification signal representative of the caller identification information while the computer system is in the sleep mode, the caller identification signal being different from a telephone ringing signal, said control circuit sending a signal to activate said first processor upon receipt of the caller identification signal and converting the caller identification signal into a caller identification message, the caller identification message being stored in a buffer before the first processor is powered up after being activated.

2. The computer system of claim 1 wherein the control circuit comprises:
   a first decoder that receives the caller identification signal when the computer system is in the sleep mode, said first decoder converting the caller identification signal into a caller identification code; and
   a second decoder coupled to the first decoder and the buffer that decodes the caller identification code, the decoded caller identification code being representative of the caller identification message.

3. The computer system of claim 2 wherein the control circuit further comprises:
   a second processor coupled to the first decoder, the second decoder, and the buffer, the second processor controlling the first decoder, the second decoder, and the buffer.

4. The computer system of claim 2 wherein the control circuit further comprises an interface circuit having an input terminal that is coupled to receive the caller identification signal, said interface circuit having an output terminal coupled to the first decoder.

5. The computer system of claim 4 wherein the control circuit further comprises:
   a control switch that detects and controls receipt of said caller identification signal.

6. The computer system of claim 1, wherein said first processor retrieves the decoded caller identification code upon receipt of said signal.

7. The computer system of claim 1, further comprising a voice mail system coupled to the control circuit that stores messages.

8. A circuit for processing a caller identification signal received by a computer system during a sleep mode, comprising:
   a first decoder that receives the caller identification signal when the computer system is in the sleep mode, the caller identification signal being different from a telephone ringing signal, said first decoder sending a signal to activate the computer system upon receipt of the caller identification signal and converting the caller identification signal into a caller identification code;

a second decoder coupled to the first decoder that decodes said caller identification code; and a buffer coupled to the second decoder that stores the decoded caller identification code before the computer system is powered up after being activated.

9. The circuit of claim 8 further comprising a processor coupled to the first decoder, the second decoder and the buffer, the processor controlling the first decoder, the second decoder, and the buffer.

10. The circuit of claim 8, further comprising an interface circuit having an input terminal that is coupled to receive the caller identification signal, and an output terminal coupled to the first decoder.

11. The circuit of claim 10, further comprising a control switch that detects and controls receipt of said caller identification signal.

12. A method of processing a caller identification signal in a computer system during a sleep mode, comprising the steps of:

detecting the caller identification signal, the caller identification signal being different from a telephone ringing signal;

generating a signal to activate said computer system;

converting the caller identification signal to a caller identification code;

decoding the caller identification code; and storing the decoded caller identification code before the computer system is powered up after being activated.

13. The method of claim 12, further comprising the step of identifying a telephone ring signal prior to the step of detecting the caller-identification signal.

14. The method of claim 13, wherein said step of identifying comprises the step of:

determining if said telephone ring signal is representative of transmission of the caller identification signal, if so, then proceeding to the step of converting, otherwise terminating processing of said telephone ring signal.

15. The method of claim 12, further comprising the step of retrieving the stored caller identification code.

* * * * *

UNITED STATES PATENT AND TRADEMARK OFFICE
CERTIFICATE OF CORRECTION

PATENT NO. : 6,111,939
DATED : August 29, 2000
INVENTOR(S) : Barbenac

It is certified that error appears in the above-identified patent and that said Letters Patent is hereby corrected as shown below:

On the Title Page

In item [75] delete "Barbanec" and replace with --Barbenac--.

Signed and Sealed this

Fifteenth Day of May, 2001

Attest:

NICHOLAS P. GODICI

*Attesting Officer*    *Acting Director of the United States Patent and Trademark Office*